United States Patent
Mizoguchi

(10) Patent No.: US 12,013,233 B2
(45) Date of Patent: Jun. 18, 2024

(54) ACCURACY DIAGNOSTIC DEVICE AND ACCURACY DIAGNOSTIC METHOD FOR MACHINE TOOL

(71) Applicant: OKUMA CORPORATION, Niwa-Gun (JP)

(72) Inventor: Yuji Mizoguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 513 days.

(21) Appl. No.: 17/303,725

(22) Filed: Jun. 7, 2021

(65) Prior Publication Data

US 2022/0011100 A1    Jan. 13, 2022

(30) Foreign Application Priority Data

Jul. 7, 2020  (JP) ................................ 2020-117310

(51) Int. Cl.
*G01B 21/32*    (2006.01)
*G01B 21/16*    (2006.01)

(52) U.S. Cl.
CPC ............ *G01B 21/32* (2013.01); *G01B 21/16* (2013.01)

(58) Field of Classification Search
None
See application file for complete search history.

(56) References Cited

U.S. PATENT DOCUMENTS 6,000,889 A * 12/1999 Shimizu .................. 409/80

FOREIGN PATENT DOCUMENTS

JP    2019-136846 A1    8/2019

* cited by examiner

*Primary Examiner* — Erica S Lin
(74) *Attorney, Agent, or Firm* — BURR PATENT LAW, PLLC

(57) ABSTRACT

An accuracy diagnostic device that diagnoses an influence on an accuracy of a machine tool due to a thermal deformation includes a temperature change rate calculation unit, an accuracy influence degree calculation unit, and an accuracy stabilization time period calculation unit. The temperature change rate calculation unit calculates a rate of a temperature change in a predetermined portion of the machine tool as a temperature change rate. The accuracy influence degree calculation unit calculates an influence degree on the machine tool accuracy due to the thermal deformation as an accuracy influence degree, based on the temperature change rate. The accuracy stabilization time period calculation unit calculates a time period until the machine tool accuracy is stabilized as an accuracy stabilization time period, based on the temperature change rate.

4 Claims, 3 Drawing Sheets

ACCURACY DIAGNOSTIC DEVICE AND ACCURACY DIAGNOSTIC METHOD FOR MACHINE TOOL

BACKGROUND OF THE INVENTION

This application claims the benefit of Japanese Patent Application Number 2020-117310 filed on Jul. 7, 2020, the entirety of which is incorporated by reference.

FIELD OF THE INVENTION

The disclosure relates to a device and a method for predicting and diagnosing an influence on a machine tool accuracy when a temperature of the machine tool itself or a temperature of an environment in which the machine tool is installed changes.

DESCRIPTION OF RELATED ART

When a machining is performed using a machine tool, a room temperature change in a factory causes a thermal deformation, such as an expansion and a bending of the machine tool structure, and consequently, a thermal displacement occurs. The thermal displacement changes a positional relation between a tool mounted to the machine tool and a workpiece, thus degrading a machining accuracy of the workpiece.

As a method for suppressing the thermal displacement of machine tool, there has been widely used a thermal displacement correction in which temperature sensors are mounted to respective units of a structure of a machine tool, a displacement amount is calculated based on measured temperatures, and an axis moving amount is changed corresponding to the displacement amount. However, the thermal displacement correction has a limitation in accuracy, and an error occurs when the temperature change is large. Especially, when the room temperature rapidly changes at starting up of an air conditioner and the like, it is considered that the error of the thermal displacement correction increases.

As a countermeasure to the problem described above, JP-A-2019-136846 discloses a method that calculates a rate of temperature change in predetermined portions of a machine tool, and calculates an influence degree on a machine tool accuracy due to a thermal displacement based on the calculated temperature change rate. In the method, when a rapid temperature change or the like occurs, the machine tool accuracy is diagnosed as being degraded, and the fact is notified. Meanwhile, when the temperature change becomes to be slow, it is diagnosed that the machine tool accuracy is stabilized and a machining can be started. Accordingly, the poor machining accuracy can be avoided.

In the method of JP-A-2019-136846, when the machine tool accuracy is diagnosed as being degraded due to the occurrence of the rapid temperature change or the like, the machining is stopped performing during the period, which results in avoiding the poor machining accuracy. However, since the machining cannot be performed while the accuracy is diagnosed as being degraded, and it is not known when the machine tool accuracy is stabilized again to allow starting the machining, a production plan can no longer be made.

Therefore, it is an object of the disclosure to provide an accuracy diagnostic device and an accuracy diagnostic method for a machine tool that allows predicting an influence of a temperature change on a machine tool accuracy in real-time to appropriately diagnose a situation in which a thermal displacement increases, and allows facilitating a creation of a production plan.

SUMMARY OF THE INVENTION

In order to achieve the above-described object, there is provided an accuracy diagnostic device according to a first aspect of the disclosure. The accuracy diagnostic device diagnoses an influence on an accuracy of a machine tool due to a thermal deformation. The accuracy diagnostic device includes a temperature change rate calculation unit, an accuracy influence degree calculation unit, and an accuracy stabilization time period calculation unit. The temperature change rate calculation unit calculates a rate of a temperature change in a predetermined portion of the machine tool as a temperature change rate. The accuracy influence degree calculation unit calculates an influence degree on the machine tool accuracy due to the thermal deformation as an accuracy influence degree, based on the temperature change rate. The accuracy stabilization time period calculation unit calculates a time period until the machine tool accuracy is stabilized as an accuracy stabilization time period, based on the temperature change rate.

In another embodiment of the first aspect of the disclosure, the accuracy stabilization time period calculation unit may compare the current accuracy influence degree with an acceptable value of the preliminarily determined accuracy influence degree, and the accuracy stabilization time period calculation unit may calculate a time period until the accuracy influence degree falls within a range of the acceptable value again as the accuracy stabilization time period when the current accuracy influence degree deviates from the range of the acceptable value.

In another embodiment of the first aspect of the disclosure, the accuracy diagnostic device for the machine tool may further include an accuracy stabilization time period display unit that displays the accuracy stabilization time period.

In order to achieve the above-described object, there is provided an accuracy diagnostic method according to a second aspect of the disclosure. The accuracy diagnostic method diagnoses an influence on an accuracy of a machine tool due to a thermal deformation. The accuracy diagnostic method includes a temperature change rate calculation step, an accuracy influence degree calculation step, and an accuracy stabilization time period calculation step. In the temperature change rate calculation step, a rate of a temperature change is calculated in a predetermined portion of the machine tool as a temperature change rate. In the accuracy influence degree calculation step, an influence degree on the machine tool accuracy due to the thermal deformation is calculated as an accuracy influence degree, based on the temperature change rate. In the accuracy stabilization time period calculation step, a time period until the machine tool accuracy is stabilized is calculated as an accuracy stabilization time period, based on the temperature change rate.

In another embodiment of the second aspect of the disclosure, the accuracy stabilization time period calculation step may include comparing the current accuracy influence degree with an acceptable value of the preliminarily determined accuracy influence degree, and calculating a time period until the accuracy influence degree falls within a range of the acceptable value again as the accuracy stabilization time period when the current accuracy influence degree deviates from the range of the acceptable value.

In another embodiment of the second aspect of the disclosure, the accuracy diagnostic method for the machine tool may further include an accuracy stabilization time period display step of displaying the accuracy stabilization time period.

According to the disclosure, the influence on the accuracy of the machine tool due to the thermal displacement can be appropriately predicted, and the time period until the accuracy is stabilized can be predicted as the accuracy stabilization time period when it is diagnosed that the accuracy is unstable.

Since the prediction result is displayed to notify an operator, it can be seen when the accuracy of the machine tool is stabilized again and the machining can be started. Therefore, the plan for production while ensuring the required accuracy is easily made. For example, it can be planned that the machining is restarted after the accuracy is stabilized when the accuracy stabilization time period is short. When the accuracy stabilization time period is long, the plan can be changed so as to perform a machining that does not require a high accuracy first.

DETAILED DESCRIPTION OF THE INVENTION

The following describes embodiments of the disclosure based on the drawings.

Figure 1:
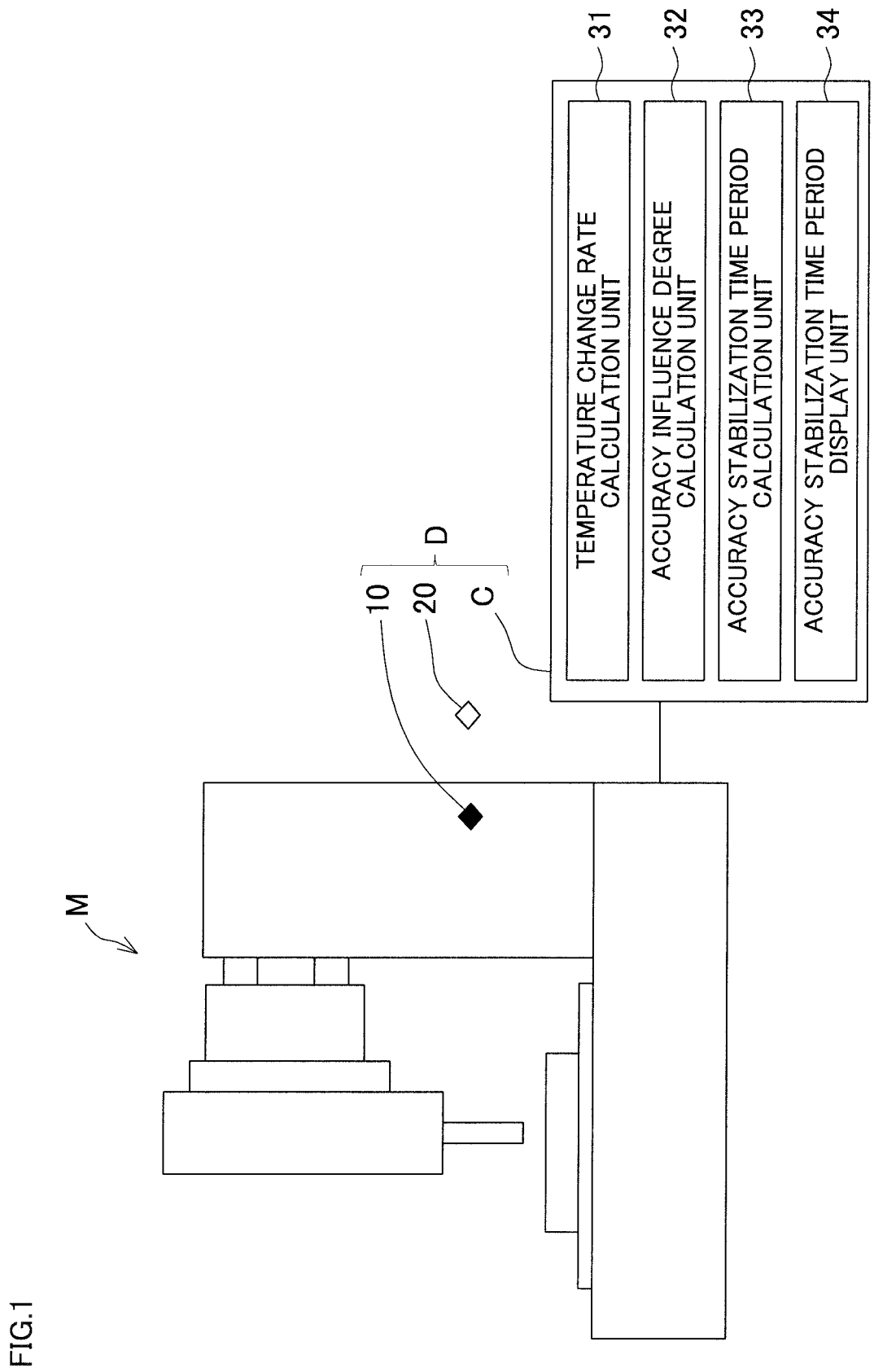
FIG. 1 is a conceptual diagram of a machine tool (vertical type machining center) and an accuracy diagnostic device.

FIG. 1 illustrates an exemplary machine tool (vertical type machining center) to which the disclosure is applied. In FIG. 1, for easily understanding the machine structure, illustrations of a cover covering an outer periphery of a machine tool M and the like are omitted. The applicable machine tool may be a machine tool having another configuration, such as a machining center having a configuration other than the vertical type machining center, a lathe, or a grinder.

A machine body temperature sensor 10 and an environmental temperature sensor 20, which measures an ambient room temperature and/or a temperature of a cutting fluid, are mounted to the machine tool M, and the machine tool M is connected to a control device C. While one machine body temperature sensor 10 and one environmental temperature sensor 20 are illustrated in FIG. 1, a plurality of machine body temperature sensors 10 and a plurality of environmental temperature sensors 20 may be disposed as necessary. The environmental temperature sensor 20 may be omitted.

Meanwhile, the control device C includes a CPU, a storage unit, a timer, an input unit (keyboard, touch panel, and the like), an output unit (monitor and the like), an interface for connecting the input unit and the output unit to the CPU, and the like.

The control device C includes a temperature change rate calculation unit 31 configured to estimate a temperature change rate of a predetermined portion in the machine tool M, based on detected temperatures by the machine body temperature sensor 10 and the environmental temperature sensor 20, in accordance with an accuracy diagnostic program stored in the storage unit.

The control device C includes an accuracy influence degree calculation unit 32 configured to calculate an influence degree on the accuracy of the machine tool M due to a thermal displacement, based on the temperature change rate estimated by the temperature change rate calculation unit 31, in accordance with the accuracy diagnostic program.

Furthermore, the control device C includes an accuracy stabilization time period calculation unit 33 configured to calculate a time period necessary for stabilizing the accuracy again as an accuracy stabilization time period, based on the temperature change rate estimated by the temperature change rate calculation unit 31, in accordance with the accuracy diagnostic program when it is diagnosed that the influence degree on the accuracy of the machine tool M is large and the accuracy is degraded.

In addition, the control device C includes an accuracy stabilization time period display unit 34 configured to display the calculated accuracy stabilization time period on the monitor in accordance with the accuracy diagnostic program. That is, the machine body temperature sensor 10, the environmental temperature sensor 20, and the control device C constitute an accuracy diagnostic device D for the machine tool M.

Figure 2:
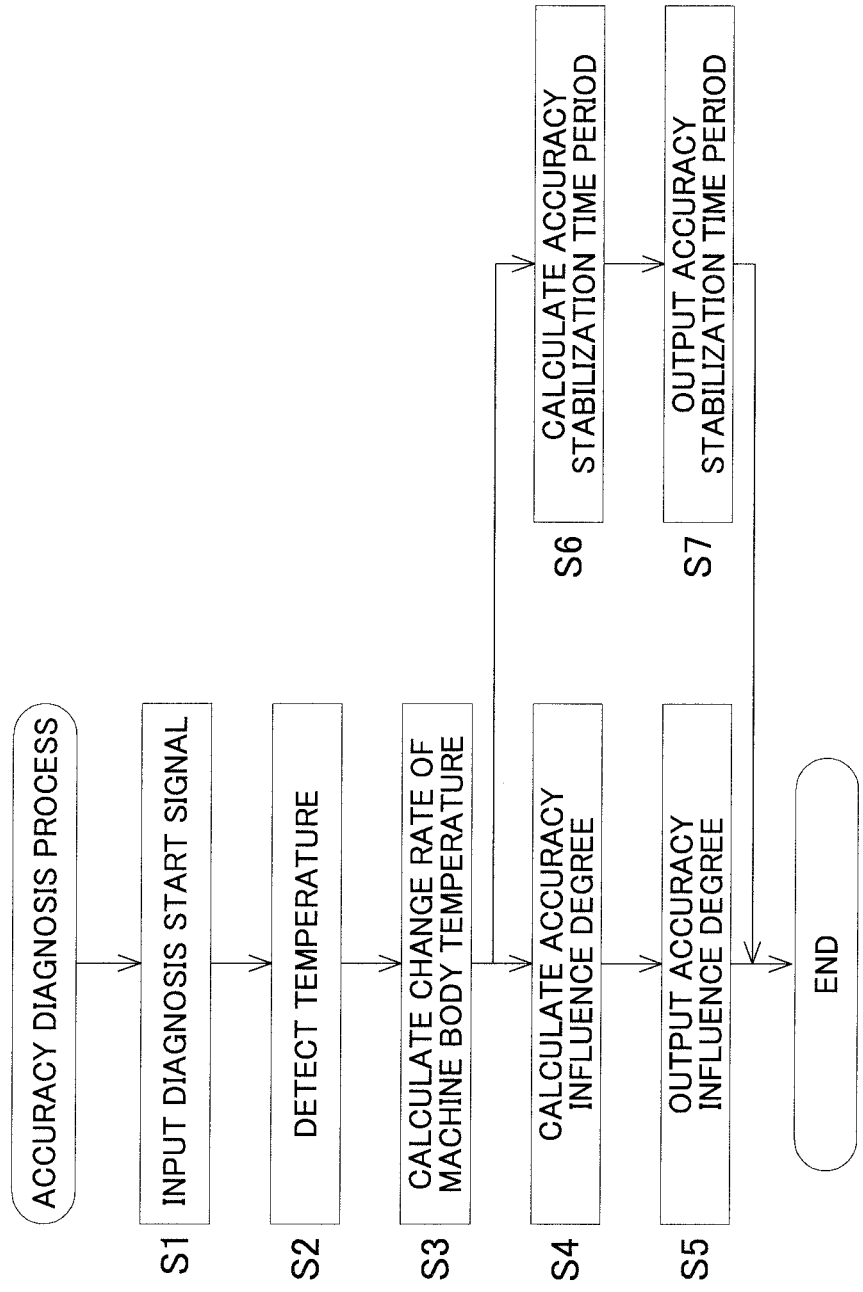
FIG. 2 is a flowchart of an accuracy diagnostic method.

Next, a description will be given of the flow of respective processes performed by the accuracy diagnostic device D and respective methods for calculating the temperature change rate, the accuracy influence degree, and the accuracy stabilization time period based on the flowchart of FIG. 2.

When diagnosing the accuracy change of the machine tool M, an accuracy diagnosis process is started by an input of a diagnosis start signal by an operator at S (step) 1. Subsequently, at S2, the temperatures are detected by the temperature sensors 10, 20 disposed at respective positions in the machine tool M. It should be noted that S1 may be omitted, and the accuracy diagnosis processes S2 to S7 may be automatically executed at predetermined time intervals without inputting the diagnosis start signal.

At S3, change rates of the machine body temperatures at the respective portions of the machine tool M are calculated (temperature change rate calculation step). The temperature change rate is obtained by calculating a difference between a current temperature and a temperature a time period Δt ago and converting it into a temperature change per unit time, for example, using Formula 1 below.

[Math. 1]

$$\dot{\theta}_m(t) = \frac{1}{\Delta t}\{\theta_m(t) - \theta_m(t - \Delta t)\} \qquad \text{(Formula 1)}$$

Δt: Time interval (s)
$\theta_m(t)$: Machine body temperature (° C.)
$\dot{\theta}_m(t)$: Change rate of machine body temperature (° C./s)

Formula 1 is an exemplary calculation method, and the temperature change rate may be obtained by other calculation methods, such as a method of filtered numerical differentiation and the method of obtaining from the difference between the machine body temperature and the ambient temperature disclosed in JP-A-2019-136846 described above.

At S4, an accuracy influence degree E is calculated with a function $f$ as the following Formula 2 from the result of the temperature change rate calculated at S3 (accuracy influence degree calculation step). Subsequently, at S5, the calculated accuracy influence degree E is output. An outputting method will be described in detail later.

[Math. 2]

$$E = f(\dot{\theta}_{m,1}, \dot{\theta}_{m,2}, \ldots, \dot{\theta}_{m,N}) \qquad \text{(Formula 2)}$$

E: Accuracy influence degree $\dot{\theta}_{m,1}$, $\dot{\theta}_{m,2}$, ..., $\dot{\theta}_{m,N}$: Temperature change rates of machine tool portions (1, 2, ..., N)

At S6, a time period until the next accuracy stabilization, that is an accuracy stabilization time period Ts, is obtained from the result of the temperature change rate calculated at S3 (accuracy stabilization time period calculation step). Subsequently, at S7, the calculated accuracy stabilization time period Ts is output (accuracy stabilization time period display step). An outputting method will be described in detail later. The accuracy stabilization time period Ts can also be expressed as a function of the temperature change rate as the following Formula 3, similarly to the accuracy influence degree E.

[Math. 3]

$$Ts = g(\dot{\theta}_{m,1}, \dot{\theta}_{m,2}, \ldots, \dot{\theta}_{m,N}) \quad \text{(Formula 3)}$$

Ts: Accuracy stabilization time period $\dot{\theta}_{m,1}$, $\dot{\theta}_{m,2}$, ..., $\dot{\theta}_{m,N}$: Temperature change rates of machine tool portions (1, 2, ..., N)

Specific calculation examples of the accuracy stabilization time period Ts are indicated by the following Formula 4a to Formula 4c. In the examples of Formula 4a to Formula 4c, it is assumed that the accuracy influence degree E is defined such that its value is increased when the accuracy is unstable and its value is decreased when the accuracy is stable. At this time, the change rate of the accuracy influence degree E is obtained. In a process in which the current accuracy influence degree E exceeds a threshold (acceptable value) $E_{limit}$, with which the accuracy is regarded as being stabilized, and the change rate of the accuracy influence degree E is positive, that is, the accuracy becomes further unstable to increase the value of the accuracy influence degree E, the accuracy stabilization time period cannot be calculated and it becomes infinite (Formula 4a). On the other hand, in a process in which the change rate of the accuracy influence degree E is negative, that is, the accuracy becomes stable to decrease the value of the accuracy influence degree E even when the current accuracy influence degree E exceeds the threshold $E_{limit}$, the time period until the value of the accuracy influence degree E becomes the threshold $E_{limit}$ or less again can be calculated assuming that the accuracy influence degree E changes at the current rate (Formula 4b). When the value of the current accuracy influence degree E is the threshold $E_{limit}$ or less, the accuracy stabilization time period becomes 0 (Formula 4c).

[Math. 4]

$$Ts(t) = \infty \left( \dot{E}(t) \geq 0 \cap E(t) > E_{limit} \right) \quad \text{(Formula 4a)}$$

$$Ts(t) = \frac{E(t) - E_{limit}}{\dot{E}(t)} \left( \dot{E}(t) < 0 \cap E(t) > E_{limit} \right) \quad \text{(Formula 4b)}$$

$$Ts(t) = 0 \, E(t) \leq E_{limit} \quad \text{(Formula 4c)}$$

$E_{limit}$: Threshold of accuracy influence degree E

Since the accuracy influence degrees E of Formula 4a to Formula 4c are functions of the temperature change rate as indicated by Formula 2, the accuracy stabilization time period Ts can be calculated from the temperature change rate. The accuracy stabilization time period Ts can also be calculated with $E_{limit}$ as 0 ($E_{limit}$=0) without setting the threshold. Furthermore, in the case that the accuracy influence degree E is defined such that its value is decreased when the accuracy is unstable and its value is increased when the accuracy is stable, it is only necessary to perform the calculation with the inequality signs of Formulas 4a to 4c inverted.

Next, examples of "S5: output accuracy influence degree" and "S7: output accuracy stabilization time period" will be described with reference to FIG. 3A to FIG. 3C.

Figure 3A:
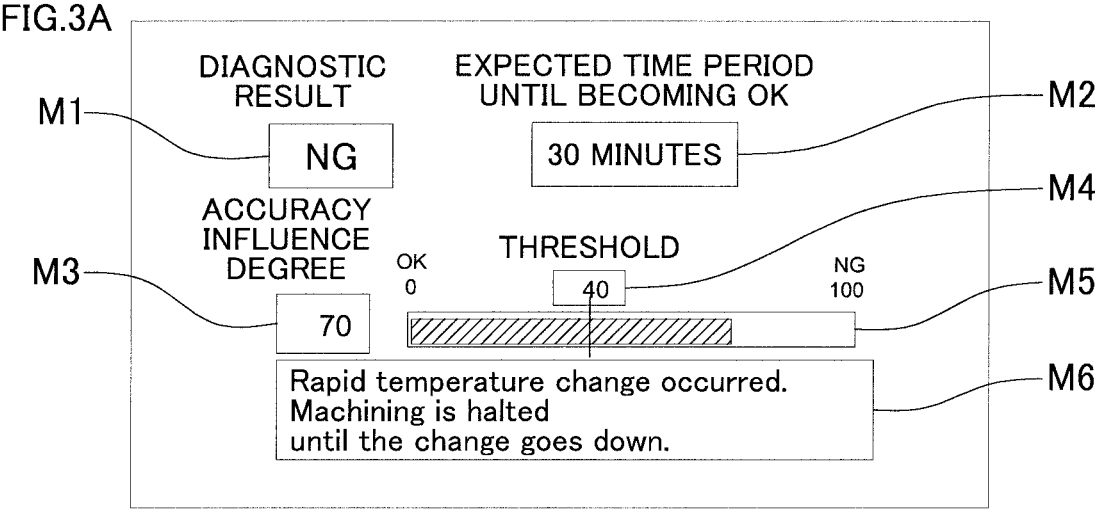
FIG. 3A to FIG. 3C are display examples of an accuracy diagnostic result and an accuracy stabilization time period.
Figure 3B:
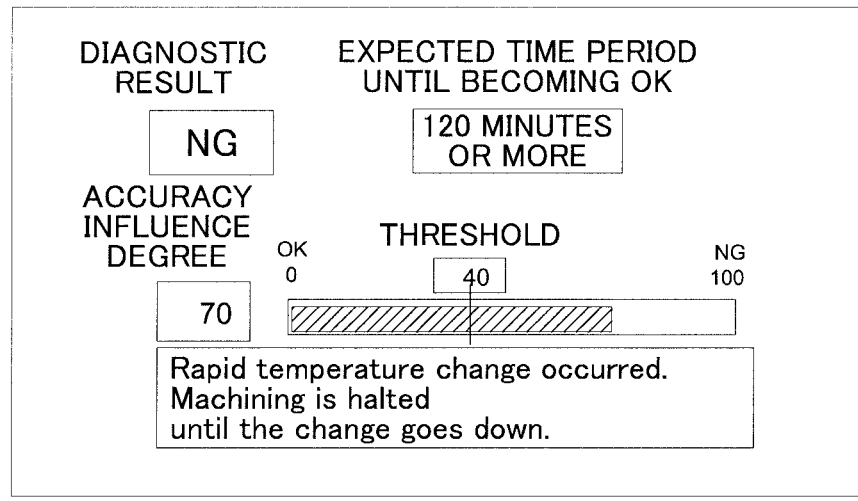
Figure 3C:
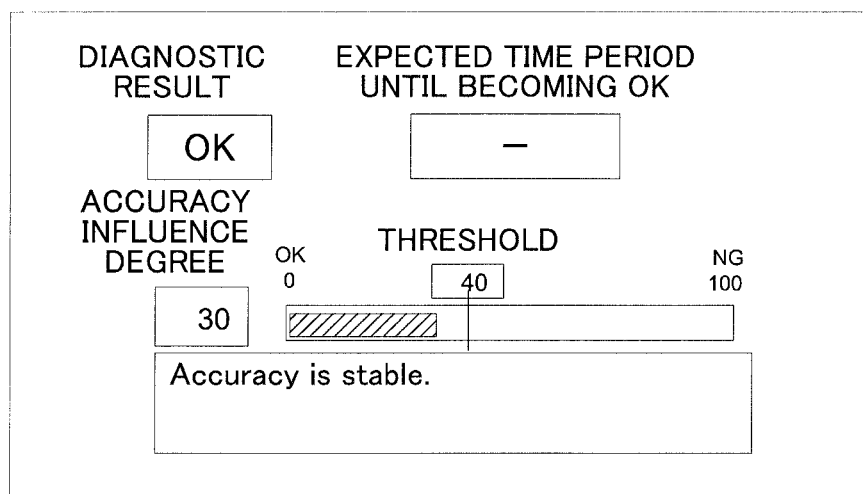

FIG. 3A, FIG. 3B, and FIG. 3C illustrate examples of a display screen of the accuracy diagnostic device D. The display screen is displayed in a monitor of the control device C of the machine tool M. Alternatively, the display screen may be displayed in a screen of a PC and the like connected to the machine tool M. The display screen of the accuracy diagnostic device D includes a diagnostic result display field M1 that displays the diagnostic result as "OK" or "NG", an accuracy stabilization time period display field M2, an accuracy influence degree display field M3, and a threshold setting field M4. Furthermore, for easy understanding of the result, a graph display field M5 and a message display field M6 are disposed as necessary.

The accuracy influence degree display field M3 displays the accuracy influence degree E calculated by Formula 2. In the threshold setting field M4, the threshold $E_{limit}$, with which the accuracy is regarded as being stabilized, is set and displayed. The diagnostic result display field M1 displays "NG" when the accuracy influence degree E is larger than the threshold $E_{limit}$, and displays "OK" when the accuracy influence degree E is smaller than the threshold $E_{limit}$ (in the case that the accuracy influence degree E is defined such that its value is increased when the accuracy is unstable and its value is decreased when the accuracy is stable). While the diagnostic result is displayed in the screen with characters as "OK" or "NG" in the example, the diagnostic result may be displayed by other methods, such as changing its color. Furthermore, it can be considered a method in which an alarm is generated in the case of "NG". The alarm can be a warning sound or an e-mail, or stop the machine. The threshold setting field M4 can be omitted by setting the threshold $E_{limit}$ to a fixed value.

The accuracy stabilization time period display field M2 displays the accuracy stabilization time period Ts. At this time, the results of Formula 4a to Formula 4c may be directly displayed, or Ts'(t) converted from Ts(t) as indicated by the following Formula 5a and Formula 5b may be displayed.

[Math. 5]

$$Ts'(t) = Ts_{limit} (Ts(t) \leq Ts_{limit}) \quad \text{Formula 5a)}$$

$$Ts'(t) = Ts(t) (Ts(t) < Ts_{limit}) \quad \text{Formula 5b)}$$

Ts(t): Calculation value of accuracy stabilization time period

Ts'(t): Display value of accuracy stabilization time period $Ts_{limit}$: Upper limit value of accuracy stabilization time period Ts Ts'(t) is set to $Ts_{limit}$ when the value of Ts(t) calculated with Formula 4a to Formula 4c is larger than a preliminarily set upper limit value $Ts_{limit}$. That is, since it is difficult to accurately calculate the accuracy stabilization time period when the value of the accuracy influence degree E is becoming deteriorated or when it is predicted to take a very long time for recovery even in the case of being recovering, Ts'(t) is indicated as a constant value or more.

FIG. 3A illustrates an exemplary display screen in the case of Formula 5b, and FIG. 3B illustrates an exemplary display screen in the case of Formula 5a. In the examples, $Ts_{limit}$ are set as 120 ($Ts_{limit}$=120), and the accuracy stabilization time period is indicated as "120 minutes or more" in FIG. 3B. When the accuracy influence degree E is smaller than the threshold, that is, when "OK" is displayed in the diagnostic result display field M1, it is not necessary to display the accuracy stabilization time period. FIG. 3C illustrates an exemplary display of the case.

The accuracy diagnostic result is displayed as "OK" or "NG", and an expected time period (accuracy stabilization time period) until the diagnostic result becomes "OK" is displayed as illustrated in FIG. 3A to FIG. 3C, thereby facilitating making a plan for production while maintaining the accuracy for the operator. For example, even when the diagnostic result is "NG", it can be planned that the machining is restarted after the accuracy is stabilized when the accuracy stabilization time period is short. When the accuracy stabilization time period is long, the plan can be changed so as to perform a machining that does not require a high accuracy first, or a countermeasure can be taken such that a factory environment, such as an air conditioning, is reviewed to stabilize the machine tool accuracy.

According to the accuracy diagnostic device D and the accuracy diagnostic method of the above-described configuration, the rate of temperature change in the predetermined portion of the machine tool M is calculated as the temperature change rate. The influence degree on the accuracy of the machine tool M due to the thermal deformation is calculated as the accuracy influence degree E based on the temperature change rate. The time period until the accuracy of the machine tool M is stabilized is calculated as the accuracy stabilization time period Ts based on the temperature change rate.

With the configuration, the influence on the accuracy of the machine tool M due to the thermal displacement can be appropriately predicted, and the time period until the accuracy is stabilized can be predicted as the accuracy stabilization time period Ts when it is diagnosed that the accuracy is unstable. Accordingly, since the prediction result is displayed to notify the operator, it can be seen when the accuracy of the machine tool M is stabilized again and the machining can be started. Therefore, the plan for production while ensuring the required accuracy is easily made.

While the accuracy influence degree and the accuracy stabilization time period are calculated using the function of the temperature change rate in the above-described configuration, the accuracy influence degree and the accuracy stabilization time period based on the temperature change rate may be calculated with reference to a preliminarily prepared database in which a relation between a value or a predetermined range of the temperature change rate, and the corresponding accuracy influence degree and accuracy stabilization time period is set.

The accuracy diagnostic device is not limited to the one configured using the control device of the machine tool. For example, the temperature change rate calculation unit, the accuracy influence degree calculation unit, the accuracy stabilization time period calculation unit, and the accuracy stabilization time period display unit may be disposed in an external server computer and the detected temperature by the temperature sensor may be transmitted to the server computer to diagnose the accuracy. In this case, a plurality of machine tools can be diagnosed at one place. A part of the accuracy diagnosis, for example, until the calculation of the accuracy stabilization time period can be externally performed, and the accuracy stabilization time period and the like can be displayed at each machine tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An accuracy diagnostic device that diagnoses an influence on an accuracy of a machine tool due to a thermal deformation, the accuracy diagnostic device comprising:
   a temperature change rate calculation unit that calculates a rate of a temperature change in a predetermined portion of the machine tool as a temperature change rate;
   an accuracy influence degree calculation unit that calculates an influence degree on the machine tool accuracy due to the thermal deformation as an accuracy influence degree, based on the temperature change rate; and
   an accuracy stabilization time period calculation unit that calculates a time period until the machine tool accuracy is stabilized as an accuracy stabilization time period, based on the temperature change rate,
   wherein the accuracy stabilization time period calculation unit compares current accuracy influence degree with an acceptable value of a preliminarily determined accuracy influence degree, and determines whether a direction of an accuracy change is stable or unstable from a change rate of the accuracy influence degree, following a calculation of the change rate of the accuracy influence degree from the current accuracy influence degree and a previous accuracy influence degree, and
   wherein the accuracy stabilization time period calculation unit (i) calculates the accuracy stabilization time period as infinity when the current accuracy influence degree deviates from a range of the acceptable value and the direction of the accuracy change is unstable, and (ii) calculates a time period until the accuracy influence degree falls within a range of the acceptable value again using the change rate of the accuracy influence degree as the accuracy stabilization time period when the current accuracy influence degree deviates from the range of the acceptable value and the direction of the accuracy change is stable.

2. The accuracy diagnostic device for the machine tool according to claim 1, further comprising
   an accuracy stabilization time period display unit that displays the accuracy stabilization time period.

3. An accuracy diagnostic method that diagnoses an influence on an accuracy of a machine tool due to a thermal deformation, the accuracy diagnostic method comprising:
   calculating a rate of a temperature change in a predetermined portion of the machine tool as a temperature change rate;
   calculating an influence degree on the machine tool accuracy due to the thermal deformation as an accuracy influence degree, based on the temperature change rate; and
   calculating a time period until the machine tool accuracy is stabilized as an accuracy stabilization time period, based on the temperature change rate;
   wherein the calculating of the accuracy stabilization time period includes comparing a current accuracy influence degree with an acceptable value of a preliminarily determined accuracy influence degree, and determining whether a direction of an accuracy change is stable or unstable from a change rate of the accuracy influence degree, following calculating the change rate of the accuracy influence degree from the current accuracy influence degree and a previous accuracy influence degree, and wherein calculating the accuracy stabilization time period includes (i) calculating the accuracy stabilization time period as infinity when the current accuracy influence degree deviates from a range of the acceptable value and the direction of the accuracy change is unstable, and (ii) calculating a time period until the accuracy influence degree falls within a range of the acceptable value again using the change rate of the accuracy influence degree as the accuracy stabilization time period when the current accuracy influence degree deviates from the range of the acceptable value and the direction of change of the accuracy change is stable.

4. The accuracy diagnostic method for the machine tool according to claim 3, further comprising displaying the accuracy stabilization time period.

\* \* \* \* \*